(12) United States Patent
Bourge et al.

(10) Patent No.: US 12,167,142 B2
(45) Date of Patent: Dec. 10, 2024

(54) APPARATUS INCLUDING A PHOTOGRAPHIC SENSOR

(71) Applicants: STMicroelectronics (Research & Development) Limited, Buckinghamshire (GB); STMicroelectronics France, Montrouge (FR)

(72) Inventors: Arnaud Bourge, Paris (FR); Tanguy Le Dauphin, Paris (FR); Antoine Drouot, Paris (FR); Brian Douglas Stewart, Edinburgh (GB)

(73) Assignees: STMicroelectronics (Research & Development) Limited, Buckinghamshire (GB); STMicroelectronics France, Montrouge (FR)

( * ) Notice: Subject to any disclaimer, the term of this patent is extended or adjusted under 35 U.S.C. 154(b) by 104 days.

(21) Appl. No.: 17/808,667

(22) Filed: Jun. 24, 2022

(65) Prior Publication Data

US 2023/0010182 A1    Jan. 12, 2023

(30) Foreign Application Priority Data

Jul. 9, 2021   (FR) ...................................... 2107444

(51) Int. Cl.
*H04N 23/73* (2023.01)
*H04N 23/76* (2023.01)

(52) U.S. Cl.
CPC ............. *H04N 23/73* (2023.01); *H04N 23/76* (2023.01)

(58) Field of Classification Search
CPC ...... H04N 23/73; H04N 23/76; H04N 25/531; H04N 23/745
See application file for complete search history.

(56) References Cited

U.S. PATENT DOCUMENTS

2006/0158531 A1* 7/2006 Yanof .................... H04N 23/71
348/226.1
2007/0146500 A1* 6/2007 Lee ...................... H04N 23/745
348/226.1

(Continued)

FOREIGN PATENT DOCUMENTS

JP             2006245784 A       9/2006

*Primary Examiner* — Yogesh K Aggarwal
(74) *Attorney, Agent, or Firm* — Slater Matsil, LLP

(57) ABSTRACT

In an embodiment an apparatus includes a scanning photographic sensor configured to acquire an image, according to an integration time of the sensor, of a scene illuminated with periodically emitted light pulses by a source, so that the image has a regular succession of bands with different luminosities when the integration time of the sensor is different from a period of the light pulses, a processor configured to generate a signature vector representative of the regular succession of bands with different luminosities being present in the image acquired by the photographic sensor, wherein the signature vector is independent of a reflectance of an objects of the scene and of a level of light in the scene, determine a frequency of the bands in the image on basis of the generated signature vector and determine the period of the pulses of the source on basis of the determined frequency of the bands in the image, and a controller configured to adjust the integration time of the photographic sensor so that the integration time is a multiple of the determined period of the light pulses of the source.

20 Claims, 7 Drawing Sheets

(56) References Cited

U.S. PATENT DOCUMENTS

| | | | |
|---|---|---|---|
| 2010/0045819 A1* | 2/2010 | Pillman | H04N 23/70 |
| | | | 348/226.1 |
| 2011/0205394 A1 | 8/2011 | Fuchigami | |
| 2013/0222637 A1* | 8/2013 | Wu | H04N 23/745 |
| | | | 348/226.1 |
| 2015/0207975 A1* | 7/2015 | Nguyen | H04N 23/745 |
| | | | 348/228.1 |
| 2015/0381890 A1* | 12/2015 | Povlick | G03B 15/05 |
| | | | 348/241 |
| 2016/0006919 A1 | 1/2016 | Aoyama | |
| 2017/0150030 A1* | 5/2017 | Nakamura | H04N 23/745 |
| 2021/0035272 A1* | 2/2021 | Yao | H04N 23/76 |

* cited by examiner

[Fig. 1]
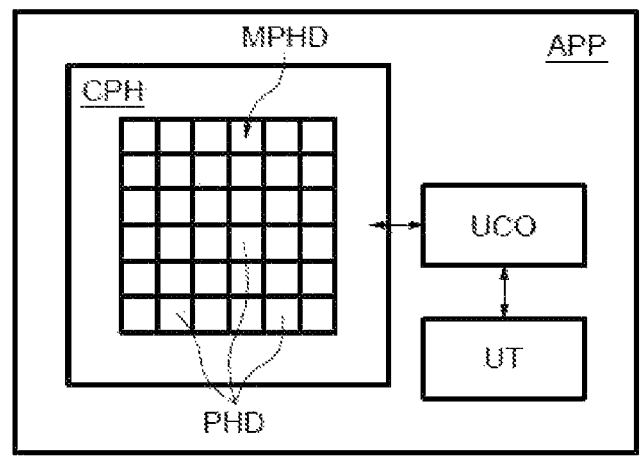
[Fig. 2]
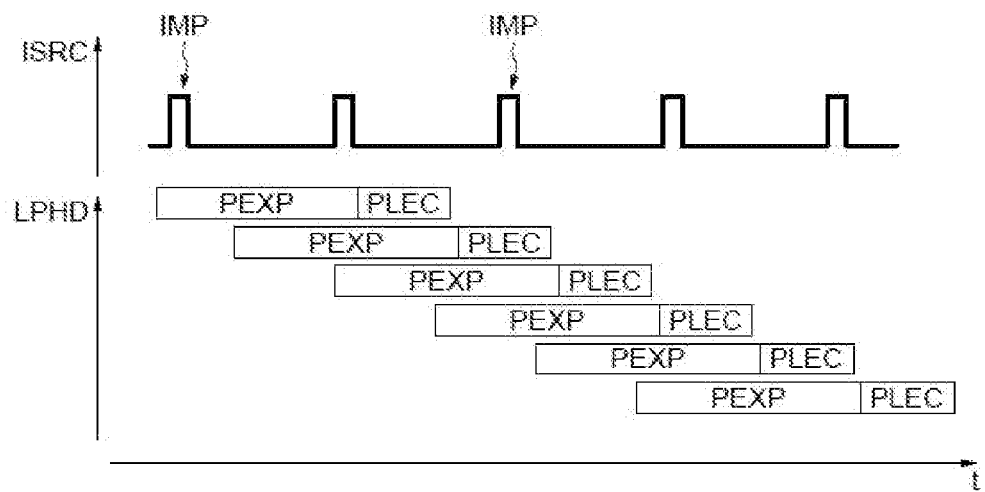
[Fig. 3]
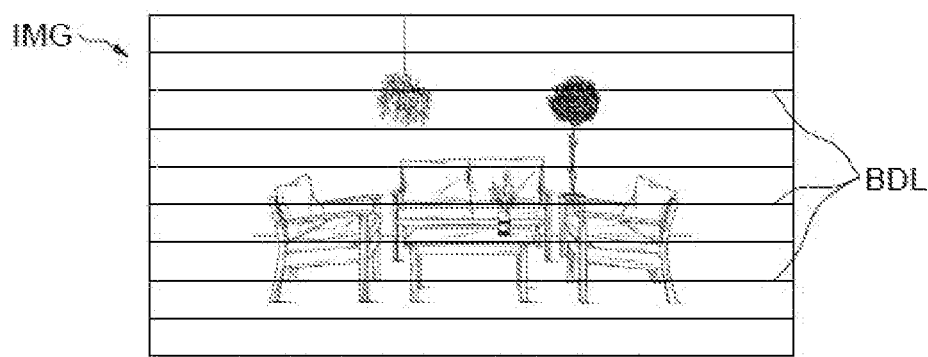

[Fig. 4]
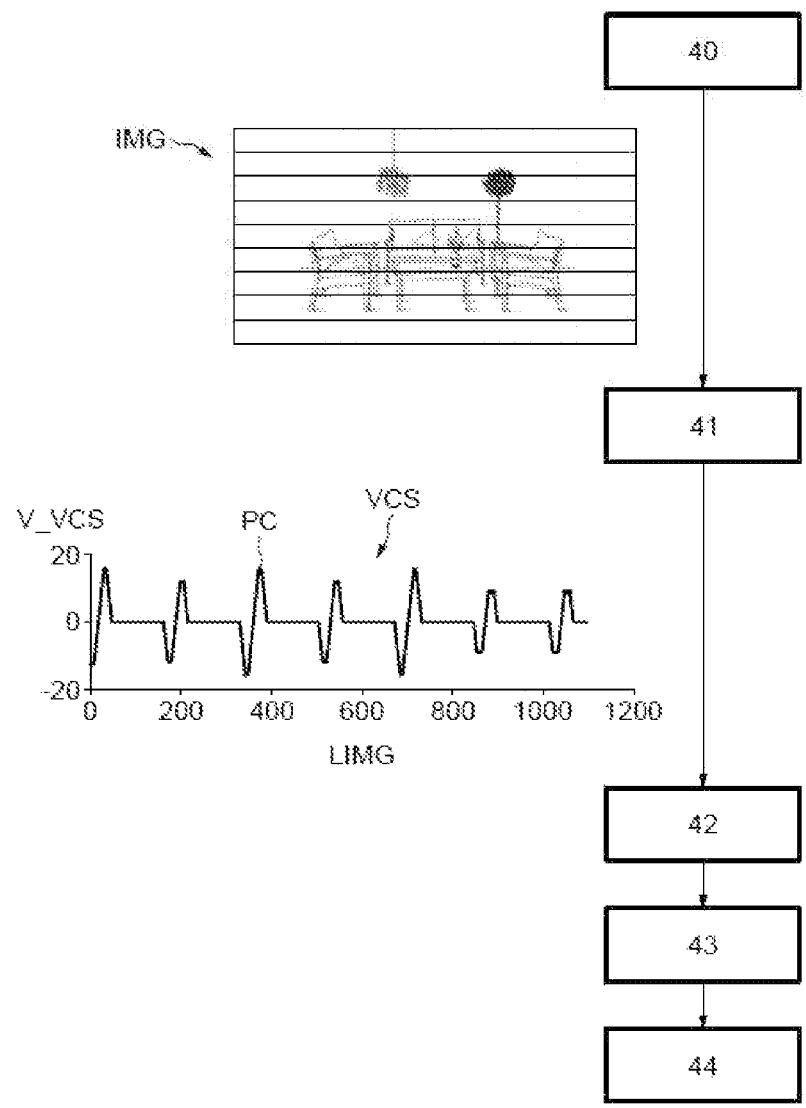

[Fig. 5]
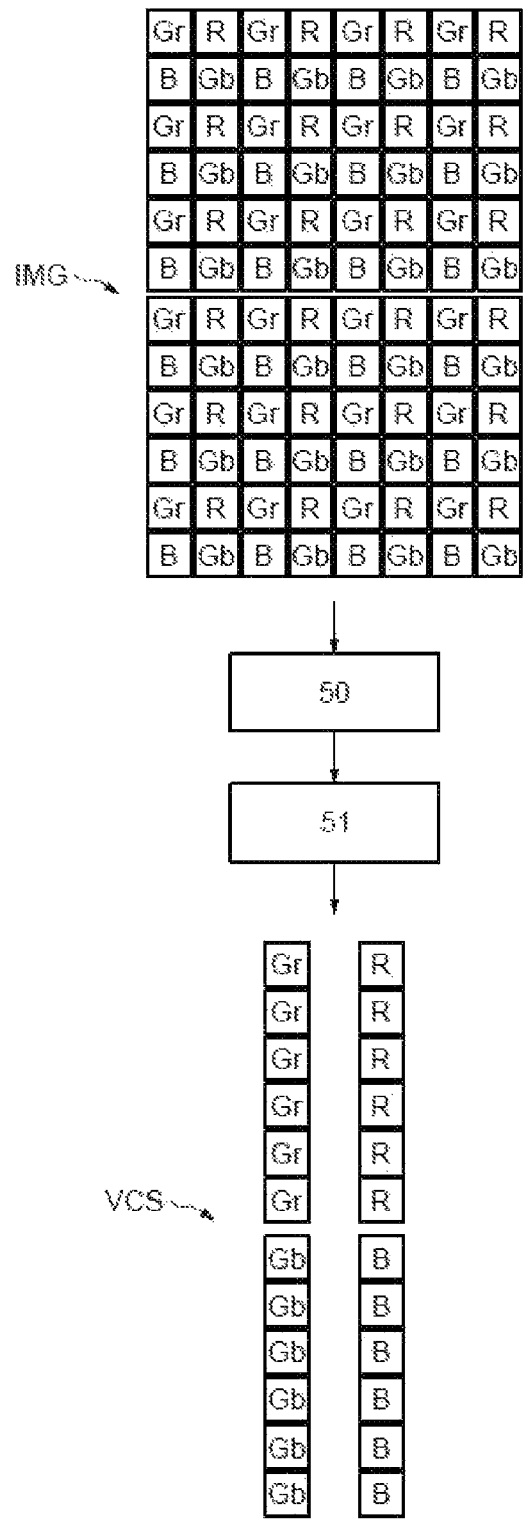

[Fig. 6]

[Fig. 7]
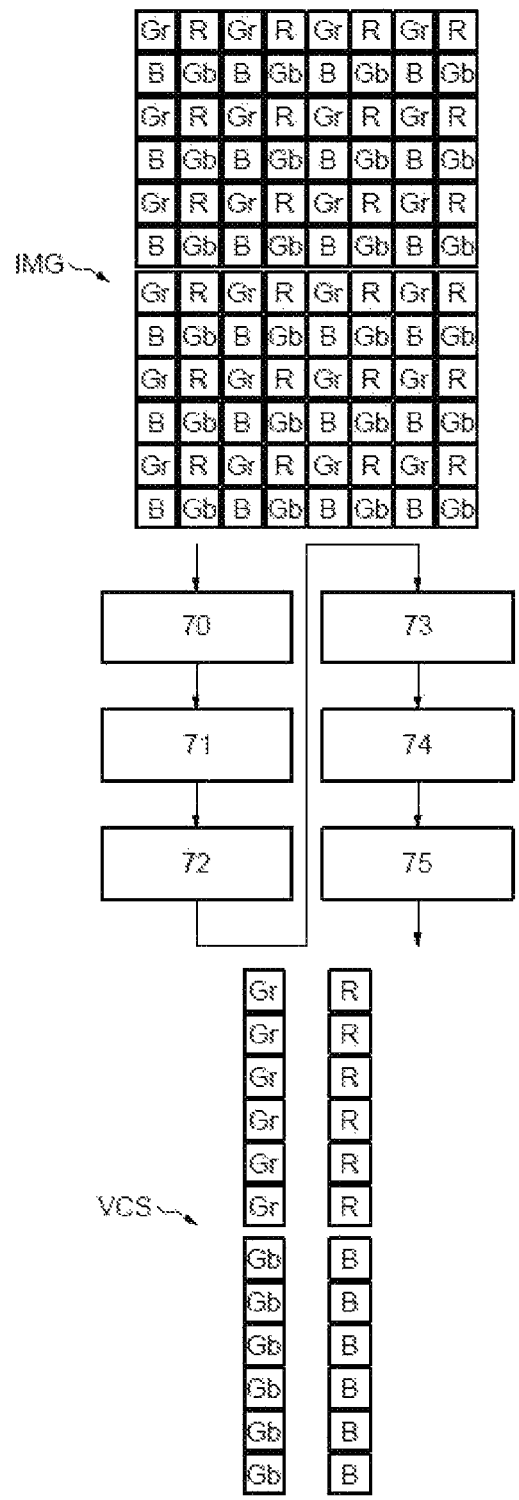

[Fig. 8]
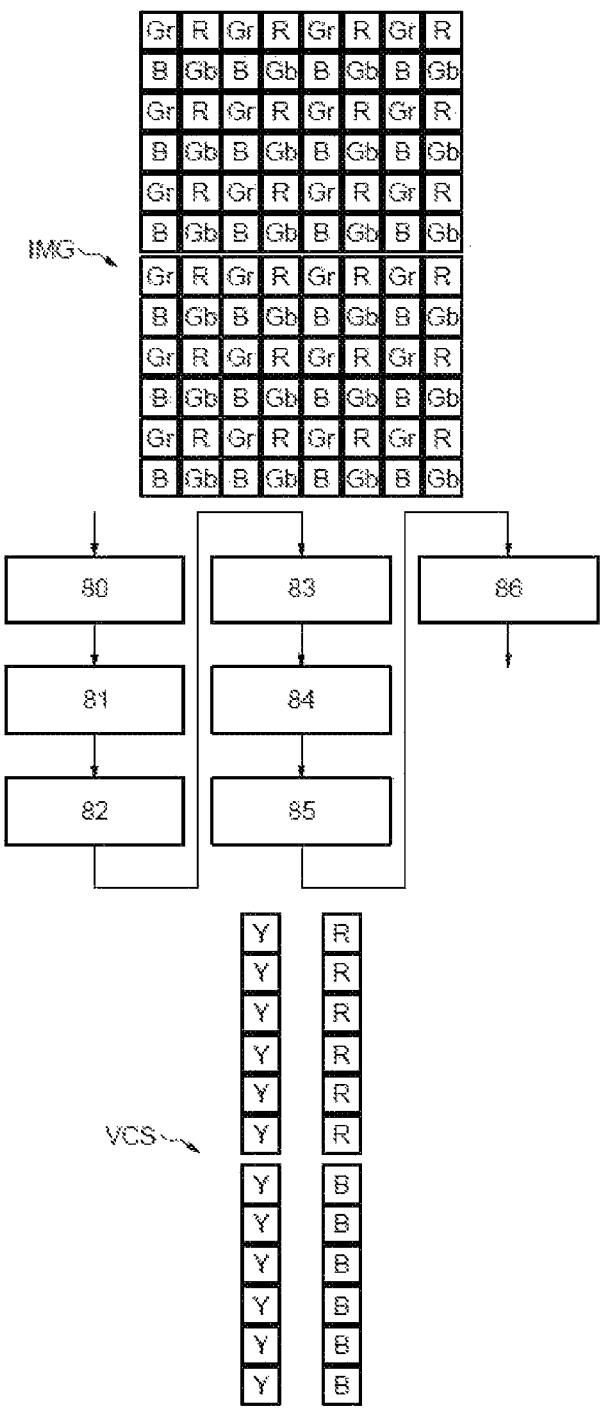

[Fig. 9]
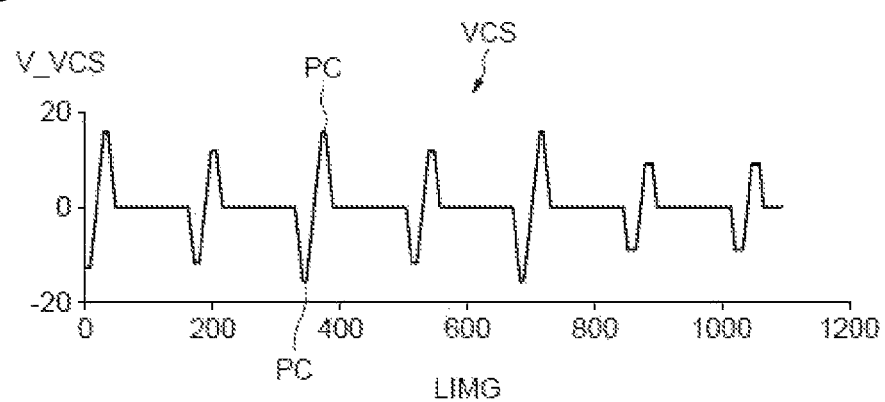

APPARATUS INCLUDING A PHOTOGRAPHIC SENSOR

CROSS-REFERENCE TO RELATED APPLICATIONS

This application claims the benefit of French Patent Application No. 2107444, filed on Jul. 9, 2021, which application is hereby incorporated herein by reference.

TECHNICAL FIELD

The disclosure relates to photographic devices, and more particularly to photographic devices having a rolling shutter photographic sensor.

BACKGROUND

Rolling shutter photographic sensors include a matrix of photodetectors in which the photodetectors are arranged in columns and in rows. The photographic sensors are configured to obtain an image by carrying out a row-by-row acquisition of the signals emitted by the photodetectors. This type of acquisition is called rolling shutter.

In particular, the rolling shutter scanning of the rows of photodetectors of the photographic sensor is carried out according to a given frequency. Thus, the various rows of the image are not acquired exactly at the same moment. The rolling shutter scanning of the rows comprises for each row a phase of exposure carried out for a given integration time followed by a reading phase. During the exposure phase, the photodetectors of the row detect the light that they receive. Then, during the reading phase, the quantity of light detected by the photodetectors is read.

Moreover, there are light sources controlled by a control signal modulated by pulse width (also known by the acronym PWM from Pulse Width Modulation). For example, the sources of light with light-emitting diodes (LEDs) are configured to control an emission of the light-emitting diodes by a signal modulated by pulse width. In particular, such sources of light are controlled by pulses of the control signal emitted periodically according to a given frequency.

The intensity of the light emitted by such a source is greater during a pulse of the control signal then decreases after a pulse until the next pulse. Thus, the intensity of the light emitted by such a light source varies over time. In particular, such a light source emits light pulses periodically. The period of the light pulses of such a source corresponds, for example, to the duration between two rising edges of two successive pulses.

The photographic sensors can acquire images illuminated by such a light source. Nevertheless, the period of the light pulses of the source can be different than the integration time of each row of the photographic sensor.

Thus, during the acquisition of a row of photodetectors of the photographic sensor, the light intensity sensed can be different from the light intensity sensed during an acquisition of rows of photodetectors preceding or following the present acquisition, the latter being offset temporally by the reading time.

This has the effect of obtaining bands with different luminosities in the image acquired. Therefore, the image acquired does not correspond to the reality perceived.

SUMMARY

Embodiments provide photographic devices and photographic sensors. Various embodiments provide bands (e.g., from rows of photodetectors) with substantially the same luminosities in acquired images. Various other embodiments provide bands with reduced or eliminated luminosity differences in acquired images.

For example, photographic sensors configured in such a way as to have an integration time that is a multiple of that of the period of the light pulses of the source have been proposed. Therefore, the duration of exposure of the photodetectors allows to receive the same average light intensity. Nevertheless, the frequency of the light pulses of the sources is not normalised. Thus, such photographic sensors do not allow to eliminate the bands with different luminosities for light sources having a frequency of light pulses different than that for which the integration time has been adapted.

Moreover, it has also been proposed to carry out a difference between two images acquired successively in such a way as to detect the bands with different luminosities before eliminating them. However, such a solution is not adapted as soon as objects or people move in the scene acquired between the two images used to carry out the difference.

It has also been proposed to add an ambient light sensor in such a way as to detect the frequency of the light pulses of the source before adjusting the integration time of the photographic sensor according to the measured frequency of the light pulses of the source. This solution turns out, however, to be costly and requires providing a location for the ambient light sensor in the apparatus incorporating the photographic sensor. This additional location can be considered to be aesthetically displeasing.

There is therefore a need to propose a simple and not very costly solution for image acquisition allowing to obtain an image of a scene illuminated by an artificial light source devoid of bands with different luminosities independently of the frequency of the light pulses of the source.

According to one embodiment, an apparatus is proposed comprising:
a scanning photographic sensor configured to be able to acquire an image, according to a given integration time of the sensor, of a scene illuminated by a source with regular light pulses, the light pulses of the source begin emitted periodically according to a given period, so that when the integration time of the sensor is different from the period of the light pulses, the image acquired can have a regular succession of bands with different luminosities,
a processing unit configured to:
generate a signature vector representative of the regular succession of bands with different luminosities present in the image acquired by the photographic sensor, the signature vector being independent of the reflectance of the objects of the scene photographed and of the level of light in the scene,
determine a frequency of the bands in the image on the basis of the signature vector generated,
determine the period of the pulses of the source on the basis of the determined frequency of the bands in the image,
a control unit configured to adjust the integration time of the photographic sensor so that the integration time is a multiple of the determined period of the light pulses of the source.

Because the signature vector is independent of the reflectance of the objects of the scene photographed and of the level of light in the scene, it is possible to simply identify the bands with different luminosities in the signature vector.

This allows to precisely determine the frequency of the bands with different luminosities, and thus the frequency of the light pulses emitted by the source.

By adjusting the integration time of the photographic sensor according to the determined frequency of the bands with different luminosities, the scanning of the rows of photodetectors of the photographic sensor is carried out so that the rows of photodetectors are exposed to the same average light intensity. Therefore, the images acquired after the adjustment do not have bands with different luminosities.

Such an apparatus thus allows to eliminate the bands with different luminosities in the images acquired after the adjustment.

Such an apparatus does not require using an additional sensor such as an ambient light sensor to determine the frequency of the light pulses of the source.

The acquired image consists of pixels having various colour components.

In an advantageous embodiment, to generate a signature vector associated with a colour component of the image, the processing unit is configured to:
for each row of the acquired image:
sum the value of the pixels having the colour component of this row in such a way as to obtain for this row a value representative of this colour component, then
divide the value representative of this colour component by a value representative of this same colour component of an adjacent row of the image.

Summing the value of the pixels having the same colour component of each row to obtain a representative value allows to improve the robustness with regard to noise.

The division allows to make the signature vector independent of the reflectance of the objects of the scene photographed and of the level of light in the scene.

Nevertheless, in an advantageous embodiment, to generate a signature vector associated with a colour component of the image, the processing unit is configured to:
for each row of the acquired image:
sum the value of the pixels having the colour component of this row in such a way as to obtain for this row a value representative of this colour component, then
calculate a logarithmic value of the value representative of this colour component of the row,
carry out a difference between the logarithmic value of the value representative of this colour component of the row and a logarithmic value of the value representative of the same colour component of an adjacent row of the image.

Passing into a logarithmic domain allows to simplify the calculations of the processing unit to generate the signature vector with respect to the division carried out in the embodiment previously described. Moreover, the use of the logarithmic domain allows to reduce the size in memory necessary to record therein the results, by a natural compression effect of the logarithm.

Preferably, to generate a signature vector associated with a luminance of the image, the processing unit is configured to:
for each row of the acquired image:
sum the value of the pixels having the same colour component of this row in such a way as to obtain for this row a representative value for each colour component, then
calculate a value representative of the luminance of the row on the basis of the values representative of the various colour components of this same row and optionally of an adjacent row,
calculate a logarithmic value of the value representative of the luminance of the row,
carry out a difference between the logarithmic value of the value representative of the luminance of the row and a logarithmic value of the value representative of the luminance of an adjacent row of the image.

The signature vector associated with the luminance has the advantage of having a high signal-to-noise ratio.

Advantageously, the scanning photographic sensor is configured to acquire a succession of images, each image of the succession of images being capable of having a regular succession of bands. The images acquired can thus consist of pixels having various colour components.

In an advantageous embodiment, to generate a signature vector associated with a colour component of the image, the processing unit is configured to:
for each row of the acquired image:
sum the value of the pixels having the colour component of this row in such a way as to obtain for this row a value representative of this colour component, then
divide the value representative of this colour component by a value representative of this same colour component of the same row of the following image or of the preceding image of the succession of images.

Nevertheless, in an advantageous embodiment, to generate the signature vector associated with a colour component of the image, the processing unit is configured to:
for each row of the acquired image:
sum the value of the pixels having the colour component of this row in such a way as to obtain for this row a value representative of this colour component, then
calculate a logarithmic value of the value representative of this colour component of the row,
carry out a difference between the logarithmic value of the value representative of this colour component of the row and a logarithmic value of the value representative of this same colour component of the same row of the following image or of the preceding image in the succession of images.

Preferably, to generate a signature vector associated with a luminance of the image, the processing unit is configured to:
for each row of the acquired image:
sum the value of the pixels having the same colour component of this row in such a way as to obtain for this row a representative value for each colour component, then
calculate a value representative of the luminance of the row on the basis of the values representative of the various colour components of this same row and of an adjacent row,
calculate a logarithmic value of the value representative of the luminance of the row,
carry out a difference between the logarithmic value of the value representative of the luminance of the row and a logarithmic value of the value representative of the luminance of the same row of the following image or of the preceding image in the succession of images.

According to another embodiment, a method for adjusting an integration time of a scanning photographic sensor is proposed, comprising:
an acquisition of an image, according to a given integration time, of a scene illuminated by a source with regular light pulses, the light pulses of the source being periodically according to a given period, so that when the integration time of the sensor is different than the period of the light pulses, the acquired image can have a regular succession of bands with different luminosities, a generation of a signature vector representative of the regular succession of bands with different luminosities present in the image acquired by the photographic sensor, the signature vector being independent of the reflectance of the objects of the scene photographed and of the level of light in the scene, a determination of a frequency of the bands in the image on the basis of the signature vector generated, a determination of the period of the pulses of the source on the basis of the determined frequency of the bands in the image, an adjustment of the integration time of the photographic sensor so that the integration time is a multiple of the period of the light pulses of the source.

BRIEF DESCRIPTION OF THE DRAWINGS

Other advantages and features of the invention will appear upon examining the detailed description of embodiments and implementations, in no way limiting, and the appended drawings in which:

FIG. 1 illustrates an apparatus according to an embodiment;

FIG. 2 shows that the exposure phases of various rows of photodetectors are offset in terms of time;

FIG. 3 shows an example of an image obtained by the photographic sensor;

FIG. 4 shows a method for adjusting the integration time of the photographic sensor in order to reduce or eliminate different luminosities in different bands in the images acquired;

FIG. 5 illustrates a method for generating signature vectors of an acquired according to a first embodiment;

FIG. 6 illustrates a method for generating signature vectors of an acquired image according to a second embodiment;

FIG. 7 illustrates a method for generating signature vectors of an acquired image according to a third embodiment;

FIG. 8 illustrates a method for generating signature vectors of an acquired image according to a fourth embodiment; and FIG. 9 illustrates a graphical representation of a signature vector VCS according to an embodiment.

DETAILED DESCRIPTION OF ILLUSTRATIVE EMBODIMENTS

FIG. 1 illustrates an apparatus APP according to an embodiment. The apparatus APP comprises a photographic sensor CPH, a control unit UCO and a processing unit UT.

The photographic sensor CPH comprises a matrix of photodetectors MPHD. The photodetectors PHD of the matrix MPHD are arranged in rows and in columns. The photodetectors PHD are associated with different colour components, in particular with red R, green Gr/Gb and blue B components. For example, the photodetectors PHD can be organised according to a Bayer matrix well known to a person skilled in the art.

The photographic sensor CPH is configured to obtain an image of a scene by acquisition of the signals generated by the photodetectors PHD on the basis of the light sensed by these photodetectors PHD.

In particular, the acquisition of the signals generated by the photodetectors PHD is carried out row by row. In other words, the photographic sensor CPH allows to obtain an image by a scanning of the rows of photodetectors PHD of the sensor CPH.

The scanning leads to an acquisition offset in terms of time of the signals of the photodetectors PHD of the various rows of photodetectors.

In particular, as shown in FIG. 2, the acquisition of a row of photodetectors PHD includes an exposure phase PEXP in which the photodetectors of the row detect the light that they receive during a given integration time. Then, the acquisition comprises a reading phase PLEC in which the quantity of light detected by the photodetectors PHD is read.

The scanning of the rows of photodetectors PHD is carried out according to a scanning frequency defined by the control unit UCO of the apparatus APP.

FIG. 2 shows that the exposure phases PEXP of the various rows LPHD of photodetectors PHD are offset in terms of time.

Moreover, the scene photographed can be illuminated by a source with regular light pulses. For example, this source can be a source with light-emitting diodes.

Such a source emits light pulses according to a given frequency.

As shown in FIG. 2, the intensity ISRC of the light emitted by such a source is maximum at the moment of the pulse IMP.

The integration time of the photographic sensor cannot be a multiple of the period of the light pulses of the source illuminating the scene.

Thus, the exposure phases PEXP of the various rows of photodetectors can be offset with respect to the light pulses IMP of the source. Therefore, the intensity ISRC of light detected by the various rows can vary. As shown in FIG. 3, the image IMG obtained by the photographic sensor thus has bands BDL with different luminosities.

The apparatus APP is configured to implement a method for adjusting the integration time of the photographic sensor, in such a way as to eliminate the bands with different luminosities in the images acquired. Such an adjustment method is illustrated in FIG. 4.

The adjustment method comprises a step 40, in which the photographic sensor CPH carries out an acquisition of at least one image IMG of a scene illuminated by a source with regular light pulses. The photographic apparatus can in particular carry out an acquisition of a succession of images.

The at least one image is then transmitted to the processing unit, in step 41.

Then, in step 42, the processing unit UT generates at least one signature vector VCS on the basis of the at least one acquired image IMG. The at least one signature vector is generated in such a way as to be able to distinguish the bands with different luminosities in the image IMG, independently of the reflectance of the objects of the scene photographed and of the level of light in the scene. Preferably, the processing unit UT is configured to generate a signature vector VCS for each colour component of the image.

Then, in step 43, the processing unit UT determines the frequency of the bands with different luminosities on the basis of the at least one signature vector VCS. The frequency of the bands with different luminosities depends on the frequency of the light pulses and the frequency of scanning of the rows of photodetectors of the sensor according to the following formula:

$$f_{bandes} = \frac{1}{f_{balayage}} * f_{impulsions},$$

where $f_{bandes}$ is the frequency of bands with different luminosities per row of the image, $f_{balayage}$ is the frequency of scanning of the rows of photodetectors of the sensor over time and $f_{impulsions}$ is the frequency of the light pulses over time.

The processing unit UT then transmits the calculated frequency of the light pulses of the source to the control unit UCO.

Finally, in step 44, the control unit UCO adapts the integration time of the photographic sensor so that the integration time is a multiple of the period of the light pulses of the source.

Therefore, the bands with different luminosities are eliminated in the next images acquired NIMG, since the average light intensity during the exposure phases of the various rows of photodetectors of the photographic sensor remains constant.

More particularly, various methods can be implemented by the processing unit to obtain a signature vector.

FIG. 5 illustrates a first embodiment of a method for generating signature vectors VCS of an acquired image IMG in isolation or in a succession of images.

In this first embodiment, the processing unit UT adds, in step 50, the values of the pixels having the same colour component of the same row of the image IMG for each row of the image, in such a way as to obtain for each row a value representative of the row for this colour component.

Then, in step 51, the processing unit UT carries out, for each row of the image and for each colour component, a division between the value representative of this colour component of this row and a value representative of this same colour component of an adjacent row of this same image. Alternatively, the processing unit carries out, for each row of the image and for each colour component, a division between the value representative of this colour component of this row and the value representative of this same colour component of the same row of a preceding image or of a following image of the succession of acquired images.

The divisions carried out allow to obtain a signature vector VCS for each colour component of the image. Each signature vector associated with a colour component comprises the result of the divisions carried out for each row of the image for this colour component.

The signature vectors VCS obtained by the aforementioned divisions have the advantage of being independent of the reflectance of the objects of the scene and of the level of light in the scene. The signature vectors VCS thus allow to visualise mainly the changes in luminosity between two bands with different luminosities appearing in the image generated. It is thus simpler to detect the bands with different luminosities on the basis of such signature vectors.

Nevertheless, the division involves a significant cost in terms of calculation resources.

In order to simplify the calculations that must be carried out by the processing unit UT, it is advantageous to go into a logarithmic domain to avoid carrying out a division between the representative values.

Figure 6:
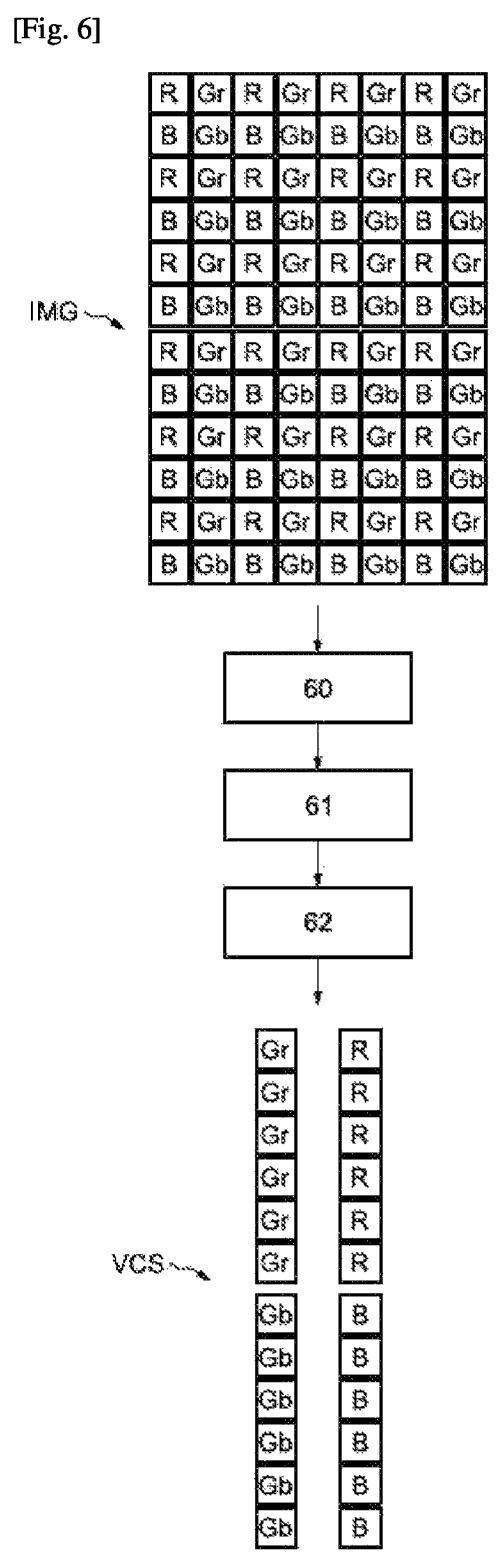

In this respect, FIG. 6 illustrates a second embodiment of a method for generating signature vectors VCS of an image IMG acquired in isolation or in a succession of images.

In this second embodiment, the processing unit UT adds, in step 60, the values of the pixels having the same colour component of the same row of the image for each row of the image, in such a way as to obtain for each row a value representative of the row for this colour component.

Then, for each row and for each colour component, the processing unit UT calculates, in step 61, a logarithmic value of the value representative of this colour component in this row. In particular, the processing unit calculates the binary logarithm of each value representative of the colour components of this row.

The processing unit UT then calculates, in step 62, for each row of the image and for each colour component, a difference between the logarithmic value of the value representative of this colour component for this row of the image and a logarithmic value of a value representative of the same colour component of an adjacent row of the image. Alternatively, the processing unit UT can calculate, for each row of the image and for each colour component, a difference between the logarithmic value of the value representative of this colour component for this row of the image and a logarithmic value of a value representative of the same colour component of the same row of a preceding image or of a following image in the succession of acquired images.

The differences carried out allow to obtain a signature vector VCS for each colour component of the image. Each signature vector associated with a colour component comprises the result of the differences carried out for each row of the image for this colour component.

Thus, in this embodiment, the processing unit simply carries out a difference in the logarithmic domain instead of a division. This allows to simplify the calculations by the processing unit UT.

FIG. 7 illustrates a third embodiment of a method for generating signature vectors VCS of an image IMG acquired in isolation or in a succession of images.

In this third embodiment, the processing unit UT counts, in step 70, for each row and for each colour component, a number of pixels to be taken into consideration to generate the signature vector of this colour component. For example, the processing unit can take into consideration all of the pixels having the same colour component of a row.

Nevertheless, alternatively, the processing unit can take into consideration only a part of the pixels having the same colour component of a row. This allows to exclude certain pixels having an aberrant value resulting from a saturation of the photodetector having generated this aberrant value or resulting from a marked contour in the scene photographed.

Then, in step 71, the processing unit UT calculates a logarithmic value of the number of pixels to be taken into consideration. In particular, the processing unit UT calculates the binary logarithm of the number of pixels to be taken into consideration.

The processing unit UT also adds, in step 72, for each row and for each colour component, the values of the pixels to be taken into consideration having the same colour component of the same row of the image for each row of the image, in such a way as to obtain for each row a value representative of the row for this colour component.

Then, in step 73, for each row and for each colour component, the processing unit UT calculates a logarithmic value of the value representative of this colour component in this row. In particular, the processing unit UT calculates the binary logarithm of each value representative of the colour components of this row.

The processing unit UT then calculates, in step 74, for each row and for each colour component, a normalised logarithmic value by carrying out a difference between the logarithmic value of the value representative of this colour component and the logarithmic value of the number of pixels to be taken into consideration. Thus, a normalised logarithmic value is similar to an average value of the values of the pixels to be taken into consideration having the same colour component of the same row of the image.

The processing unit then calculates, in step 75, for each row of the image and for each colour component, a difference between the normalised logarithmic value associated with this colour component for this row of the image and a normalised logarithmic value associated with the same colour component for an adjacent row of the image. Alternatively, the processing unit can calculate, for each row of the image and for each colour component, a difference between the normalised logarithmic value associated with this colour component for this row of the image and a normalised logarithmic value associated with the same colour component for the same row of a preceding image or of a following image in the succession of acquired images.

These differences carried out by the processing unit allow to obtain a signature vector VCS for each colour component of the image. Each signature vector VCS associated with a colour component comprises the result of the differences carried out for each row of the image for this colour component.

FIG. 8 illustrates a fourth embodiment of a method for generating signature vectors VCS of an image IMG acquired in isolation or in a succession of images.

In this fourth embodiment, the processing unit UT counts, in step 80, for each row and for each colour component, a number of pixels to be taken into consideration to generate the signature vector of this colour component.

The processing unit UT also adds, in step 81, for each row and for each colour component, the values of the pixels to be taken into consideration having the same colour component of the same row of the image for each row of the image, in such a way as to obtain for each row a value representative of the row for this colour component.

Then, in step 82, the processing unit UT replaces, for each row, the value representative of the green component of this row with a value representative of a luminance Y of this row. The value representative of the luminance of a row is calculated by a weighted average of the values representative of the colour components of this row and optionally of an adjacent row in the case of a Bayer matrix.

Then, in step 83, for each row and for the red and blue colour components and for the luminance, the processing unit UT calculates a logarithmic value of the value representative of this colour component or of this luminance in this row. In particular, the processing unit UT calculates the binary logarithm of each value representative of the red and blue colour components and of the luminance of this row.

The processing unit UT also calculates, in step 84, a logarithmic value of the number of pixels to be taken into consideration. In particular, the processing unit calculates the binary logarithm of the number of pixels to be taken into consideration.

The processing unit UT then calculates, in step 85, for each row and for the red and blue colour components and for the luminance, a normalised logarithmic value by carrying out a difference between the logarithmic value of the value representative of this colour component or of the luminance and the logarithmic value of the number of pixels to be taken into consideration.

The processing unit UT then calculates, in step 86, for each row of the image and for the red and blue colour components, a difference between the normalised logarithmic value associated with this colour component for this row of the image and a normalised logarithmic value associated with the same colour component for an adjacent row of the image. The processing unit UT also calculates, for each row of the image, a difference between the normalised logarithmic value associated with the luminance for this row of the image and a normalised logarithmic value associated with the luminance for an adjacent row of the image.

Alternatively, the processing unit UT can calculate, for each row of the image and for the red and blue colour component, a difference between the normalised logarithmic value associated with this colour component for this row of the image and a normalised logarithmic value associated with the same colour component for the same row of a preceding image or of a following image in the succession of images. The processing unit UT thus also calculates, for each row of the image, a difference between the normalised logarithmic value associated with the luminance for this row of the image and a normalised logarithmic value associated with the luminance for the same row of a preceding image or of a following image in the succession of images.

These differences carried out by the processing unit UT allow to obtain signature vectors VCS for the red and blue colour components and for the luminance of the image.

The signature vector associated with the luminance has the advantage of having a high signal-to-noise ratio.

FIG. 9 illustrates a graphical representation of a signature vector VCS that can be obtained by the embodiments described above.

The signature vector VCS has values V_VCS for the various rows LIMG of an image acquired by the photographic sensor. As shown in FIG. 9, the values V_VCS vary only for the rows on the edge of the bands with different luminosities present in the image. These variations are in the form of amplitude peaks PC in FIG. 9.

The frequency of the bands with different luminosities can thus be extracted from the signature vector VCS in order to carry out an adjustment of the integration time of the photographic sensor to eliminate the bands with different luminosities in the next images acquired of the scene, as has been described above.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus comprising:
    a scanning photographic sensor configured to acquire an image, according to an integration time of the sensor, of a scene illuminated with periodically emitted light pulses by a source, so that the image has a regular succession of bands with different luminosities when the integration time of the sensor is different from a period of the light pulses;
    a processor configured to:
        generate a signature vector for a color component of the image representative of the regular succession of bands with different luminosities being present in the image acquired by the photographic sensor, wherein the signature vector is independent of a reflectance of an object of the scene and of a level of light in the scene;
        determine a frequency of the bands in the image on basis of the generated signature vector; and
        determine the period of the pulses of the source on basis of the determined frequency of the bands in the image; and a controller configured to adjust the integration time of the photographic sensor so that the integration time is a multiple of the determined period of the light pulses of the source, wherein the processor is, for a row of the image, configured to:
   sum a value of pixels having the color component of the row in such a way as to obtain a value representative of the color component for the row, and
   then divide the value representative of the color component by a value representative of this same color component of an adjacent row of the image.

2. The apparatus according to claim 1, wherein the scanning photographic sensor is configured to acquire a succession of images, each image of the succession of images comprising a succession of bands.

3. The apparatus according to claim 1, wherein the processor is configured to generate the signature vector for each color component of a plurality of color components of the image.

4. The apparatus according to claim 1, wherein the processor is, for a row of the image, further configured to:
   sum a value of pixels having the color component of the row in such a way as to obtain a value representative of the color component for the row,
   calculate a logarithmic value of the value representative of the color component of the row, and
   calculate a difference between the logarithmic value of the value representative of the color component of the row and a logarithmic value of the value representative of the same color component of an adjacent row of the image.

5. The apparatus according to claim 1,
wherein the signature vector is generated as a signature vector associated with a luminance of the image, and
wherein the processor is, for a row of the image, further configured to:
   sum a value of pixels having the same color component of the row in such a way as to obtain a representative value for each color component for the row,
   calculate a value representative of the luminance of the row on basis of the values representative of various color components of the same row and optionally of an adjacent row,
   calculate a logarithmic value of the value representative of the luminance of the row, and
   calculate a difference between the logarithmic value of the value representative of the luminance of the row and a logarithmic value of the value representative of the luminance of an adjacent row of the image.

6. The apparatus according to claim 1, wherein the processor is, for a row of the image, further configured to:
   sum a value of pixels having the color component of the row in such a way as to obtain a value representative of the color component for the row, and
   divide the value representative of the color component by a value representative of the same color component of the same row of the following image or of a preceding image in a succession of images.

7. The apparatus according to claim 1, wherein the processor is, for a row of the image, further configured to:
   sum a value of pixels having the color component of the row in such a way as to obtain a value representative of the color component for the row,
   calculate a logarithmic value of the value representative of the color component of the row, and
   calculate a difference between the logarithmic value of the value representative of this color component of the row and a logarithmic value of the value representative of the same color component of the same row of a following image or of a preceding image in a succession of images.

8. The apparatus according to claim 1,
wherein the signature vector is generated as a signature vector associated with a luminance of the image, and
wherein the processor is, for a row of the image, further configured to:
   sum a value of pixels having the same color component of the row in such a way as to obtain a representative value for each color component of the row,
   calculate a value representative of the luminance of the row on basis of the values representative of various color components of the same row and of an adjacent row,
   calculate a logarithmic value of the value representative of the luminance of the row, and
   calculate a difference between the logarithmic value of the value representative of the luminance of the row and a logarithmic value of the value representative of the luminance of the same row of the following image or of a preceding image in a succession of images.

9. The apparatus according to claim 1, wherein the signature vector is generated from the same image.

10. A method comprising:
acquiring, by a scanning photographic sensor according to an integration time, an image of a scene illuminated by a source emitting periodic light pulses so that the image has a regular succession of bands with different luminosities when the integration time is different than a period of the light pulses;
generating, by a processor, a signature vector for a color component of the image representative of the regular succession of bands with different luminosities, the signature vector being independent of a reflectance of objects of the scene and of a level of light in the scene;
determining, by the processor, a frequency of the bands in the image on basis of the generated signature vector;
determining, by the processor, the period of the pulses of the source on basis of the determined frequency of the bands in the image; and
adjusting, by a controller, the integration time of the photographic sensor so that the integration time is a multiple of the period of the light pulses of the source,
wherein the signature vector is generated as a signature vector associated with a luminance of the image, and
wherein the method, for a row of the image, further comprises:
   summarizing, by the processor, a value of pixels having the same color component of the row in such a way as to obtain a representative value for each color component for the row,
   calculating, by the processor, a value representative of the luminance of the row on basis of the values representative of various color components of the same row and optionally of an adjacent row,
   calculating, by the processor, a logarithmic value of the value representative of the luminance of the row, and
   calculating, by the processor, a difference between the logarithmic value of the value representative of the luminance of the row and a logarithmic value of the value representative of the luminance of an adjacent row of the image.

11. The method according to claim 10, wherein the scanning photographic sensor acquires a succession of images, each image of the succession of images comprising a succession of bands.

12. The method according to claim 10, wherein the method, for a row of the image, further comprises:
summarizing, by the processor, a value of pixels having the color component of the row in such a way as to obtain a value representative of the color component for the row, and
then dividing, by the processor, the value representative of the color component by a value representative of this same color component of an adjacent row of the image.

13. The method according to claim 10, wherein generating, by the processor, the signature vector for the color component of the image comprises generating, by the processor, the signature vector for each color component for a plurality of color components of the image.

14. The method according to claim 10, wherein the method, for a row of the image, further comprises:
summarizing, by the processor, a value of pixels having the color component of the row in such a way as to obtain a value representative of the color component for the row,
calculating, by the processor, a logarithmic value of the value representative of the color component of the row,
calculating, by the processor, a difference between the logarithmic value of the value representative of the color component of the row and a logarithmic value of the value representative of the same color component of an adjacent row of the image.

15. The method according to claim 10, wherein the method, for a row of the image, further comprises:
summarizing, by the processor, a value of pixels having the color component of the row in such a way as to obtain a value representative of the color component for the row, and
dividing, by the processor, the value representative of the color component by a value representative of the same color component of the same row of the following image or of a preceding image in a succession of images.

16. The method according to claim 10, wherein the method, for a row of the image, further comprises:
summarizing, by the processor, a value of pixels having the color component of the row in such a way as to obtain a value representative of the color component for the row,
calculating a logarithmic value of the value representative of the color component of the row, and
calculating a difference between the logarithmic value of the value representative of this color component of the row and a logarithmic value of the value representative of the same color component of the same row of the following image or of a preceding image in a succession of images.

17. The method according to claim 10,
wherein the method, for each a row of the image, further comprises:
summarizing, by the processor, a value of pixels having the same color component of the row in such a way as to obtain a representative value for each color component of the row,
calculating, by the processor, a value representative of the luminance of the row on basis of the values representative of various color components of the same row and of an adjacent row,
calculating, by the processor, a logarithmic value of the value representative of the luminance of the row, and
calculating, by the processor, a difference between the logarithmic value of the value representative of the luminance of the row and a logarithmic value of the value representative of the luminance of the same row of the following image or of a preceding image in a succession of images.

18. The method according to claim 10, wherein the signature vector is generated from the same image.

19. An apparatus comprising:
a scanning photographic sensor configured to acquire an image, according to an integration time of the sensor, of a scene illuminated with periodically emitted light pulses by a source, so that the image has a regular succession of bands with different luminosities when the integration time of the sensor is different from a period of the light pulses;
a processor configured to:
generate a signature vector for a color component of the image representative of the regular succession of bands with different luminosities being present in the image acquired by the photographic sensor, wherein the signature vector is independent of a reflectance of an object of the scene and of a level of light in the scene;
determine a frequency of the bands in the image on basis of the generated signature vector; and
determine the period of the pulses of the source on basis of the determined frequency of the bands in the image; and
a controller configured to adjust the integration time of the photographic sensor so that the integration time is a multiple of the determined period of the light pulses of the source,
wherein the processor is, for a row of the image, configured to:
sum a value of pixels having the color component of the row in such a way as to obtain a value representative of the color component for the row,
calculate a logarithmic value of the value representative of the color component of the row, and
calculate a difference between the logarithmic value of the value representative of the color component of the row and a logarithmic value of the value representative of the same color component of an adjacent row of the image.

20. A method comprising:
acquiring, by a scanning photographic sensor according to an integration time, an image of a scene illuminated by a source emitting periodic light pulses so that the image has a regular succession of bands with different luminosities when the integration time is different than a period of the light pulses;
generating, by a processor, a signature vector for a color component of the image representative of the regular succession of bands with different luminosities, the signature vector being independent of a reflectance of objects of the scene and of a level of light in the scene;
determining, by the processor, a frequency of the bands in the image on basis of the generated signature vector;
determining, by the processor, the period of the pulses of the source on basis of the determined frequency of the bands in the image; and
adjusting, by a controller, the integration time of the photographic sensor so that the integration time is a multiple of the period of the light pulses of the source, wherein the signature vector is generated as a signature vector associated with a luminance of the image, and wherein the method, for a row of the image, further comprises:

summarizing, by the processor, a value of pixels having the same color component of the row in such a way as to obtain a representative value for each color component of the row, calculating, by the processor, a value representative of the luminance of the row on basis of the values representative of various color components of the same row and of an adjacent row, calculating, by the processor, a logarithmic value of the value representative of the luminance of the row, and calculating, by the processor, a difference between the logarithmic value of the value representative of the luminance of the row and a logarithmic value of the value representative of the luminance of the same row of the following image or of a preceding image in a succession of images.

* * * * *

UNITED STATES PATENT AND TRADEMARK OFFICE
CERTIFICATE OF CORRECTION

| | | |
|---|---|---|
| PATENT NO. | : 12,167,142 B2 | Page 1 of 1 |
| APPLICATION NO. | : 17/808667 | |
| DATED | : December 10, 2024 | |
| INVENTOR(S) | : Bourge et al. | |

It is certified that error appears in the above-identified patent and that said Letters Patent is hereby corrected as shown below:

In the Claims

In Column 13, in Claim 17, Line 58, after "for" delete "each".

Signed and Sealed this
Fourth Day of February, 2025

Coke Morgan Stewart
*Acting Director of the United States Patent and Trademark Office*